US009061552B2

(12) United States Patent
Hada

(10) Patent No.: US 9,061,552 B2
(45) Date of Patent: Jun. 23, 2015

(54) PNEUMATIC TIRE

(71) Applicant: SUMITOMO RUBBER INDUSTRIES, LTD., Kobe-shi, Hyogo (JP)

(72) Inventor: Yoshihiro Hada, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 308 days.

(21) Appl. No.: 13/713,290

(22) Filed: Dec. 13, 2012

(65) Prior Publication Data

US 2013/0167994 A1    Jul. 4, 2013

(30) Foreign Application Priority Data

Dec. 28, 2011    (JP) .................................. 2011-289679

(51) Int. Cl.
*B60C 11/03*    (2006.01)
*B60C 11/04*    (2006.01)
(Continued)

(52) U.S. Cl.
CPC ......... *B60C 11/032* (2013.04); *B60C 2011/039* (2013.04); *B60C 2011/0341* (2013.04); *B60C 2011/0386* (2013.04); *B60C 2011/036* (2013.04); *B60C 11/0306* (2013.04); *B60C 11/1369* (2013.04); *B60C 11/0304* (2013.04);
(Continued)

(58) Field of Classification Search
CPC ............ B60C 11/0304; B60C 11/0306; B60C 2011/039; B60C 2011/0386; B60C 2011/0341; B60C 2011/036; B60C 2011/0381; B60C 11/032; B60C 11/117

USPC ................. 152/209.8, 209.9, 209.27, 209.18, 152/209.17, DIG. 3, 902, 209.16
See application file for complete search history.

(56) References Cited

U.S. PATENT DOCUMENTS 7,360,569 B2 *    4/2008  Nakagawa ................. 152/209.9
2002/0139460 A1 * 10/2002  Boiocchi et al. ........... 152/209.2
(Continued)

FOREIGN PATENT DOCUMENTS

JP    2004155416 A  *  6/2004  ............. B60C 11/04
JP    2005138678 A  *  6/2005  ............ B60C 11/117
(Continued)

OTHER PUBLICATIONS

Machine Translation: JP2008-195100; Takahashi, Toshihiko; no date.*
(Continued)

*Primary Examiner* — Justin Fischer
*Assistant Examiner* — Kendra Ly
(74) *Attorney, Agent, or Firm* — Birch, Stewart, Kolasch & Birch, LLP

(57) ABSTRACT

A tread portion 2 of a pneumatic tire is divided by a center longitudinal groove and a shoulder longitudinal groove into a center land portion 6, an outer middle land portion 7A, an inner middle land portion 7B, an outer shoulder land portion 8A, and an inner shoulder land portion 8B. The outer shoulder land portion 8A includes an array of outer shoulder blocks 22 which are sectioned by outer shoulder lateral grooves 5A. The inner shoulder land portion 8B includes inner shoulder lateral grooves 26 having an inner end 26$i$ and an outer end 26$o$ in the land portion 8B, and inner shoulder auxiliary grooves 28 disposed between the inner shoulder lateral grooves 26, 26 which are circumferentially adjacent to each other and having inner ends 28$i$ and outer ends 28$o$ in the land portion 8B.

6 Claims, 5 Drawing Sheets

(51) Int. Cl.
- *B60C 11/11* (2006.01)
- *B60C 11/117* (2006.01)
- *B60C 11/12* (2006.01)
- *B60C 11/00* (2006.01)
- *B60C 11/13* (2006.01)

(52) U.S. Cl.
CPC . *B60C2011/0388* (2013.04); *B60C 2011/0353* (2013.04); *B60C 2011/0369* (2013.04); *B60C 2011/0348* (2013.04); *B60C 2011/1254* (2013.04); *B60C 11/12* (2013.01); *B60C 2011/0381* (2013.04); *B60C 2011/0393* (2013.04)

(56) References Cited

U.S. PATENT DOCUMENTS

| | | |
|---|---|---|
| 2008/0000564 A1 | 1/2008 | Mukai |
| 2010/0116393 A1* | 5/2010 | Miyazaki ................. 152/209.18 |
| 2010/0212792 A1* | 8/2010 | Mita .......................... 152/209.9 |

FOREIGN PATENT DOCUMENTS

| | | | |
|---|---|---|---|
| JP | 2008-6987 A | 1/2008 | |
| JP | 2008195100 A * | 8/2008 | .............. B60C 11/12 |

OTHER PUBLICATIONS

Machine Translation: JP2004-155416; Schomburg et al.; no date.*
Machine Translation: JP2005-138678; Hirose, Katsumi; no date.*

* cited by examiner

PNEUMATIC TIRE

BACKGROUND OF THE INVENTION

1. Field of the Invention

The present invention relates to a pneumatic tire capable of improving drainage performance, on-snow performance, and on-ice performance, while maintaining steering stability on a dry road surface.

2. Description of the Related Art

A pneumatic tire (which is also referred to as an all-season tire) with improved driving performance for a dry road surface as well as an icy or snowy road and the like has been known. This type of tire has a tread portion including multiple blocks which are sectioned by circumferentially extending longitudinal grooves and axially extending lateral grooves. Such longitudinal grooves and lateral grooves can smoothly discharge a water film interposed between the tire and a road surface. In addition, the longitudinal and lateral grooves can dig into a snowy road and obtain snow column shearing force. Consequently, the drainage performance and on-ice performance are improved.

For example, axially extending sipes are provided in the blocks. Edges of such sipes can generate considerable friction force on an icy road, thereby improving the on-ice performance. Listed below are related technologies.

PRIOR ART REFERENCE

Patent Document

Patent Document 1: Japanese Patent Application Publication No. 2008-6987

However, simply providing the longitudinal grooves, lateral grooves, and sipes as described above on the tread portion tends to result in small lateral rigidity of the tread portion. As a result, there is a problem that the steering stability is deteriorated on a dry road surface.

The present invention has been made in view of the actual circumstances as described above, and it is a main object of the present invention to provide a pneumatic tire capable of improving the drainage performance, on-snow performance, and on-ice performance while maintaining the steering stability on a dry road surface.

SUMMARY OF THE INVENTION

A first aspect of the present invention is a pneumatic tire having a designated mounting orientation with respect to a vehicle, wherein a tread portion includes a pair of center longitudinal grooves which continuously extends in a circumferential direction on both sides of a tire equator and a pair of shoulder longitudinal grooves which continuously extends in the circumferential direction on both sides of the pair of center longitudinal grooves, the pair of center longitudinal grooves consists of an outer center longitudinal groove and an inner center longitudinal groove, the outer center longitudinal groove and the inner center longitudinal groove being respectively located on an outer side and an inner side of the vehicle when the tire is mounted to the vehicle, the pair of shoulder longitudinal grooves consists of an outer shoulder longitudinal groove disposed on the vehicle outer side of the outer center longitudinal groove and an inner shoulder longitudinal groove disposed on a vehicle inner side of the inner center longitudinal groove, the tread portion is divided into:
a center land portion between the pair of center longitudinal grooves;
an outer middle land portion between the outer center longitudinal groove and the outer shoulder longitudinal groove;
an inner middle land portion between the inner center longitudinal groove and the inner shoulder longitudinal groove;
an outer shoulder land portion located of the vehicle outer side of the outer shoulder longitudinal groove; and
an inner shoulder land portion located of the vehicle inner side of the inner shoulder longitudinal groove, the outer shoulder land portion includes an array of blocks in which outer shoulder blocks sectioned by outer shoulder lateral grooves are disposed in the circumferential direction, the outer shoulder lateral grooves extend from a vehicle-outer-side tread ground-contact end to the inner side of the vehicle and traverse the outer shoulder land portion, the inner shoulder land portion includes inner shoulder lateral grooves and inner shoulder auxiliary grooves, the inner shoulder lateral grooves extending to the outer side of the vehicle from an inner end which is spaced from a vehicle-inner-side tread ground-contact end to the outer side of the vehicle and having an outer end terminating within the inner shoulder land portion, the inner shoulder auxiliary grooves being disposed between the inner shoulder lateral grooves which are circumferentially adjacent to each other, extending to the outer side of the vehicle from an inner end which is spaced from the vehicle-inner-side tread ground-contact end to the outer side of the vehicle, and having an outer end terminating within the inner shoulder land portion, and the inner middle land portion includes an inner middle sub-groove and inner middle sipes, the inner middle sub-groove continuously extends in the circumferential direction at a position which is on the vehicle inner side of a width center of the inner middle land portion, and the inner middle sipes extend between the inner middle sub-groove and the inner center longitudinal groove with an inclination with respect to the circumferential direction.

In the specification, unless otherwise stated, dimensions of respective parts of a tire are values specified in an unloaded standard state in which a tire is mounted around a standard rim and filled with a standard internal pressure.

The "standard rim" is a rim defined for each tire by a standard in a standard system including the standard on which the tire is based. For example, it means a normal rim in JATMA, "Design Rim" in TRA, and "Measuring Rim" in ETRTO.

The "standard internal pressure" is an air pressure defined by the standard for each tire, and shall be a maximum air pressure in JATMA, a maximum value described in the table "TIRE LOAD LIMITS AT VARIOUS COLD INFLATION PRESSURES" in TRA, and "INFLATION PRESSURE" in ETRTO. It shall be 180 kPa for a tire for a passenger vehicle.

A pneumatic tire of the present invention is a tire having a designated mounting orientation with respect to a vehicle, and having a tread portion in which are provided a pair of center longitudinal grooves which continuously extend in a circumferential direction on both sides of a tire equator and a pair of shoulder longitudinal grooves which continuously extend in the circumferential direction on both sides of the pair of center longitudinal grooves.

The pair of center longitudinal grooves consists of an outer center longitudinal groove and an inner center longitudinal groove, the outer center longitudinal groove and the inner center longitudinal groove being respectively located on an outer side and an inner side of the vehicle when a tire is mounted to the vehicle. The pair of shoulder longitudinal grooves consists of an outer shoulder longitudinal groove disposed on a vehicle outer side of the outer center longitudinal groove and an inner shoulder longitudinal groove disposed on a vehicle inner side of the inner center longitudinal groove.

The tread portion is further divided into a center land portion located between the pair of center longitudinal grooves, an outer middle land portion located between the outer center longitudinal groove and the outer shoulder longitudinal groove, an inner middle land portion located between the inner center longitudinal groove and the inner shoulder longitudinal groove, an outer shoulder land portion located on the vehicle outer side of the outer shoulder longitudinal groove, and an inner shoulder land portion located on the vehicle inner side of the inner shoulder longitudinal groove.

The outer shoulder land portion includes outer shoulder lateral grooves which extend from a vehicle-outer-side tread ground-contact end to the inner side of the vehicle and traverse the outer shoulder land portion. The outer shoulder lateral grooves divide the outer shoulder land portion into multiple outer shoulder blocks. In such an outer shoulder land portion, at the time of revolution when a ground-contact pressure increases, the outer shoulder lateral grooves allow a water film between the tire and a road surface to be discharged smoothly. In addition, since the outer shoulder lateral grooves dig into a snowy road, the snow column shearing force is obtained, thereby improving the drainage performance and on-snow performance.

In addition, the inner shoulder land portion includes inner shoulder lateral grooves and inner shoulder auxiliary grooves. The inner shoulder lateral grooves extend to the outer side of the vehicle from an inner end which is spaced from the vehicle-inner-side tread ground-contact end, and the outer end terminates within the inner shoulder land portion. In addition, the inner shoulder auxiliary grooves are disposed between the inner shoulder lateral grooves which are circumferentially adjacent to each other, extending to the outer side of the vehicle from an inner end which is spaced from the vehicle-inner side tread ground-contact end, and having the outer end terminating within the inner shoulder land portion.

With such inner shoulder lateral grooves, a water film between the inner shoulder land portion and a road surface is smoothly discharged, thereby improving the drainage performance. In addition, since the inner shoulder lateral grooves dig into a snowy road, the snow column shearing force is obtained, thereby improving the drainage performance and on-snow performance. In addition, with circumferential edges of the inner shoulder auxiliary grooves, considerable friction force is obtained on an icy road, thereby improving the on-ice performance. Furthermore, the inner shoulder lateral grooves and the inner shoulder auxiliary grooves are not in communication with the tread ground-contact end and the inner shoulder longitudinal groove. Thus, the inner shoulder land portion is formed into a straight rib with high lateral rigidity. This improves the steering stability on a dry road surface.

In addition, the inner middle land potion includes an inner middle sub-groove and inner middle sipes. The inner middle sub-groove continuously extends in the circumferential direction at a position on a vehicle inner side of a width center of the inner middle land portion. In addition, the inner middle sipes extend between the inner middle sub-groove and inner center longitudinal groove with an inclination with respect to the circumferential direction.

With such an inner middle sub-groove, a water film between the inner middle land portion and a road surface is smoothly discharged, thereby improving the drainage performance. In addition, with the inner middle sub-groove and the inner middle sipes, the edge effect is produced in the circumferential and axial directions, thereby improving the on-ice performance. Furthermore, in the inner middle land portion, no inner middle sipes are formed on the vehicle inner side of the inner middle sub-groove. Thus, lateral rigidity of the inner middle land portion is ensured and the steering stability on a dry surface is improved.

DESCRIPTION OF THE PREFERRED EMBODIMENTS

In the following, one embodiment of the present invention will be described based on the drawings.

Figure 1:
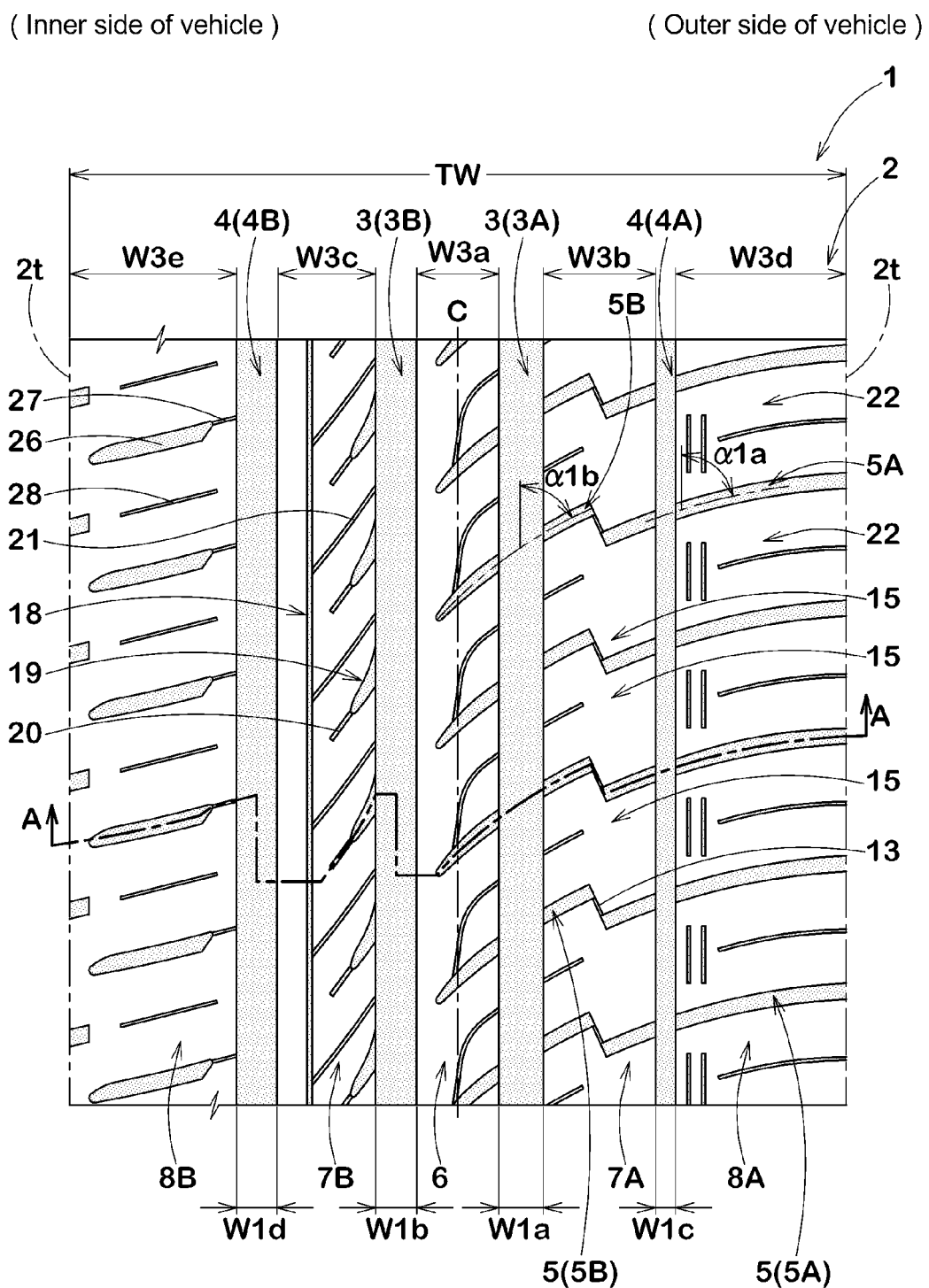
FIG. 1 is an expansion plan of a tread portion showing a pneumatic tire of an embodiment.

As shown in FIG. 1, a pneumatic tire 1 of the embodiment (which may be simply referred to as a tire hereinafter) is constituted as so-called an all-season tire having improved driving performance on a dry road surface as well as an icy or snowy road, for example.

A tread portion 2 of the tire 1 includes a pair of center longitudinal grooves 3 which continuously extends in a circumferential direction on both sides of a tire equator C and a pair of shoulder longitudinal grooves 4 which continuously extends in the circumferential direction on both sides of the pair of center longitudinal grooves 3. In addition, the tread portion 2 includes lateral grooves 5 which extend in a direction intersecting with the center longitudinal grooves 3 and the shoulder longitudinal grooves 4 and are provided at intervals in the circumferential direction.

The center longitudinal grooves 3 consist of an outer center longitudinal groove 3A and an inner center longitudinal groove 3B, the outer center longitudinal groove 3A and the inner center longitudinal groove 3B being respectively located on an outer side and an inner side of the vehicle when a tire is mounted to the vehicle. The shoulder longitudinal grooves 4 consist of an outer shoulder longitudinal groove 4A disposed on a vehicle outer side of the outer center longitudinal groove 3A and an inner shoulder longitudinal groove 4B disposed on the vehicle inner side of the inner center longitudinal groove 3B.

This divides the tread portion 2 into:
 a center land portion 6 between the pair of center longitudinal grooves 3A, 3B;
 an outer middle land portion 7A between the outer center longitudinal groove 3A and the outer shoulder longitudinal groove 4A;

an inner middle land portion 7B between the inner center longitudinal groove 3B and the inner shoulder longitudinal groove 4B;

an outer shoulder land portion 8A located on the vehicle outer side of the outer shoulder longitudinal groove 4A; and an inner shoulder land portion 8B located on the vehicle inner side of the inner shoulder longitudinal groove 4B.

Figure 2:
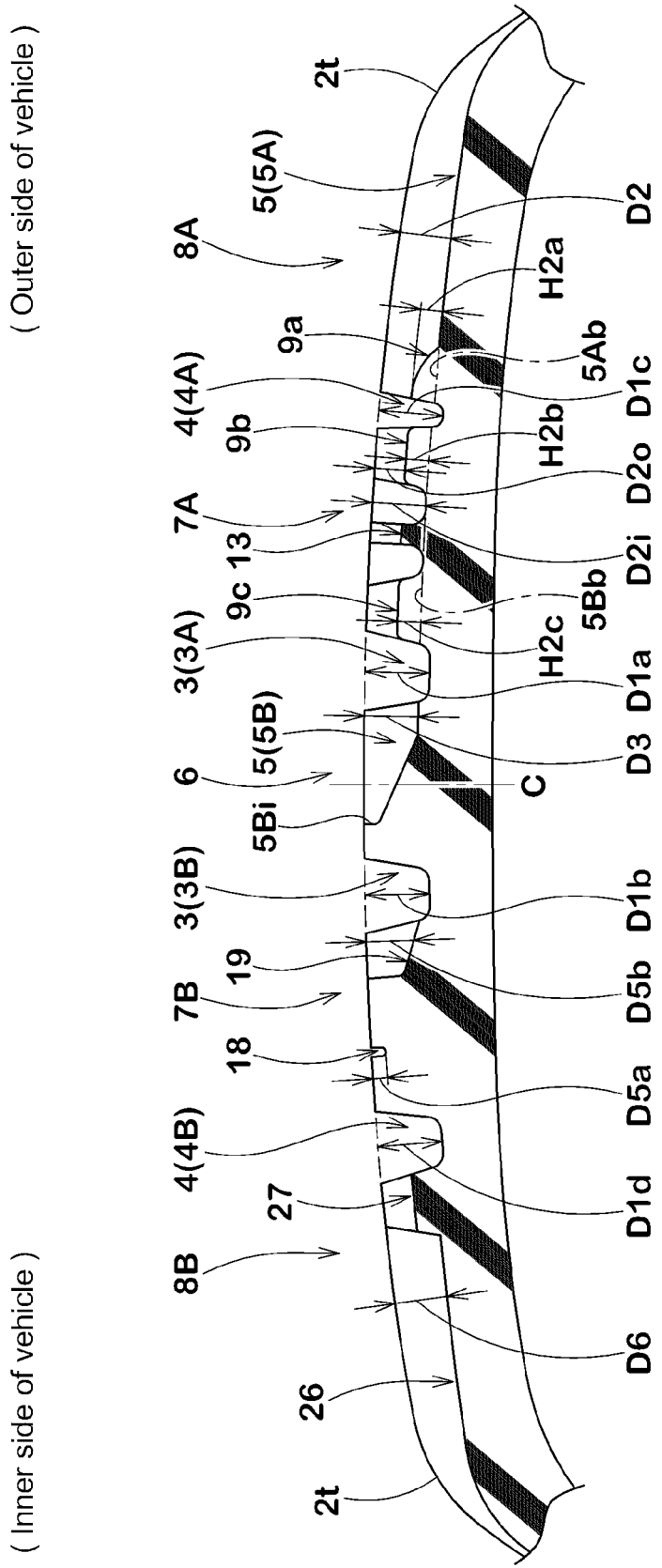
FIG. 2 is a cross sectional view of A-A in FIG. 1.

The outer center longitudinal groove 3A and the inner center longitudinal groove 3B are formed as a straight groove linearly extending in the circumferential direction. With such an outer center longitudinal groove 3A and an inner center longitudinal groove 3B, a water film between the tread portion 2 and a road surface is smoothly guided to the circumferential direction in a neighborhood of the tire equator C. Additionally, the outer center longitudinal groove 3A and the inner center longitudinal groove 3B dig into a snowy road and snow column shearing force is obtained. This improves drainage performance and on-snow performance. It is preferable that a groove width W1a of the outer center longitudinal groove 3A and a grove width W1b of the inner center longitudinal groove 3B are in the range of 4 to 10% of a tread ground-contact width TW, which is an axial distance between tread ground-contact ends 2t, 2t. It is also preferable that a maximum groove depth D1a (as shown in FIG. 2) of the outer center longitudinal groove 3A and a maximum groove depth D1b of the inner center longitudinal groove 3B (as shown in FIG. 2) are in the range of 6 to 10 mm.

In the specification, the "tread ground-contact end 2t" shall be an axial outermost end of a tread ground-contact surface when the tire 1 in a state in which it is mounted on the standard rim and filled with the standard internal pressure is given normal load and brought into contact with a flat surface at a camber angle of 0 degree.

The "normal load" is a load defined for each tire by the standard, and is a maximum air pressure in JATMA, a maximum value described in the table "TIRE LOAD LIMITS AT VARIOUS COLD INFLATION PRESSURES" in TRA, and "LOAD CAPACITY" in ETRTO.

In the embodiment, the groove width W1a of the outer center longitudinal groove 3A is set larger than the groove width W1b of the inner center longitudinal groove 3B. With this, the outer center longitudinal groove 3A improves the drainage performance and on-snow performance when a vehicle travels in a straight line or when it is revolving in which a ground-contact pressure of the outer side of the vehicle increases. A ratio (W1a/W1b) of the groove width W1a of the outer center longitudinal groove 3A to the groove width W1b of the inner center longitudinal groove 3B is preferably 105 to 120%.

The outer shoulder longitudinal groove 4A and the inner shoulder longitudinal groove 4B are also formed as a straight groove. This improves the drainage performance and on-snow performance. It is preferable that a groove width W1c of the outer shoulder longitudinal groove 4A and a groove width W1d of the inner shoulder longitudinal groove 4B are in the range of 3 to 8% of the tread ground-contact width TW. It is preferable that a maximum groove depth D1c (as shown in FIG. 2) of the outer shoulder longitudinal groove 4A and a maximum groove depth D1d (as shown in FIG. 2) of the inner shoulder longitudinal groove 4B are in the range of 6 to 10 mm.

The groove width W1c of the outer shoulder longitudinal groove 4A is set smaller than the groove widths W1a, W1b of the pair of center longitudinal grooves 3A, 3B and the groove width W1d of the inner shoulder longitudinal groove 4B. This increases a land ratio of the tread portion 2 on the outer side of the vehicle, and improves the steering stability and wear resistance. A ratio (W1c/W1a) of the groove width W1c of the outer shoulder longitudinal groove 4A to the groove width W1a of the outer center longitudinal groove 3A is preferably 30 to 70%.

Figure 3:
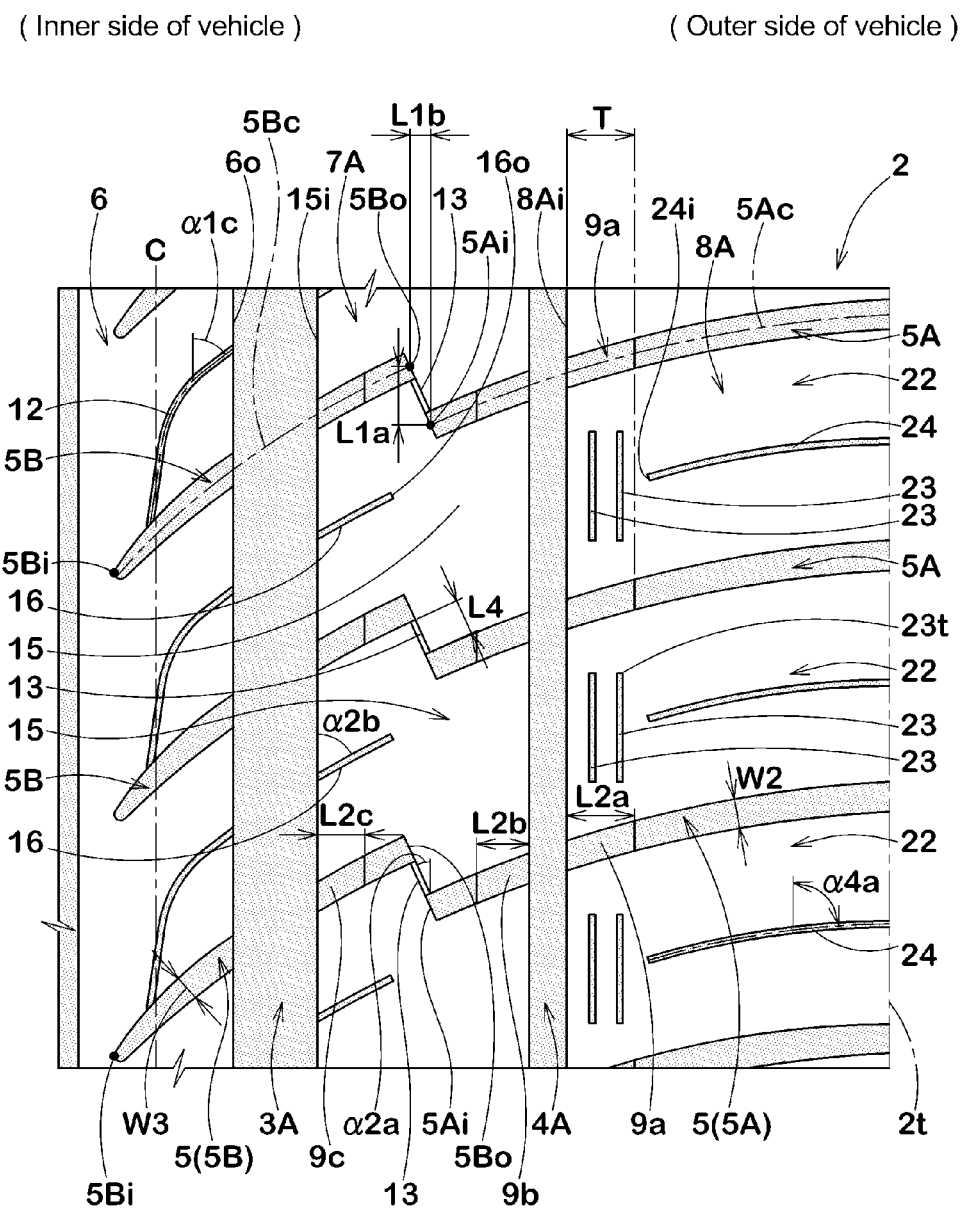
FIG. 3 is an enlarged view of FIG. 1 on an outer side of the vehicle.

As shown in FIG. 3 in a close-up manner, the lateral grooves include outer shoulder lateral grooves 5A and outer middle lateral grooves 5B. Crossing the outer shoulder land portion 8A, the outer shoulder lateral grooves 5A extend from the vehicle-outer-side tread ground-contact end 2t to the inner side of the vehicle. In addition, vehicle-inner-side inner ends 5Ai of the outer shoulder lateral grooves 5A terminate within the outer middle land portion 7A. In addition, going across the tire equator C, the outer middle lateral grooves 5B extend to the inner side of the vehicle from vehicle-outer-side outer ends 5Bo which are located in the outer middle land portion 7A. In addition, vehicle-inner-side inner ends 5Bi of the outer middle lateral grooves 5B terminate within the center land portion 6.

with such outer shoulder lateral grooves 5A and outer middle lateral grooves 5B, a water film between the tread portion 2 and a road surface is smoothly guided in the axial direction to the outer side of the tire, in a neighborhood of the tire equator C and in a region on a vehicle outer side of the tire equator c. In addition, the outer shoulder lateral grooves 5A and the outer middle lateral grooves 5B dig into a snowy road and snow column shearing force is obtained. This improves the drainage performance and on-ice performance. It is preferable that a grove width W2 of the outer shoulder lateral grooves 5A and a groove width W3 of the outer middle lateral grooves 5B are in the range of 1 to 4% of the tread ground-contact width TW. It is preferable that a groove depth D2 (as shown in FIG. 2) of the outer shoulder lateral grooves 5A and a groove depth D3 (as shown in FIG. 2) of the outer middle lateral grooves 5B are in the range of 6 to 10 mm.

The inner ends 5Ai of the outer shoulder lateral grooves 5A are circumferentially shifted from the outer ends 5Bo of the outer middle lateral grooves 5B. In addition, the inner ends 5Ai of the outer shoulder lateral grooves 5A are disposed on a vehicle outer side of the outer ends 5Bo of the outer middle lateral grooves 5B.

Such outer shoulder lateral grooves 5A and outer middle lateral grooves 5B prevent deterioration in rigidity of the outer middle land portion 7A. This improves the steering stability and wear resistance. It is preferable that a circumferential distance L1a between the inner ends 5Ai of the outer shoulder lateral grooves 5A and the outer ends 5Bo of the outer middle lateral grooves 5B is in the range of 5 to 10 mm. It is also preferable that an axial distance Lib between the inner ends 5Ai and the outer ends 5Bo is in the range of 2 to 5 mm. Here, the distances L1a, L1b are values measured on center lines 5Ac, 5Bc of the outer shoulder lateral grooves 5A and the outer middle lateral grooves 5B.

If the distance L1a is less than 5 mm, rigidity of the land portion between the inner ends 5Ai of the outer shoulder lateral grooves 5A and the outer ends 5Bo of the outer middle lateral grooves 5B deteriorates. As a result, rubber chipping and the like tend to occur in this area. To the contrary, if the distance L1a exceeds 10 mm, the outer shoulder lateral grooves 5A and the outer middle lateral grooves 5B are excessively spaced in the circumferential direction. Thus, it is possible that the drainage performance may not be adequately maintained. From such a viewpoint, a lower limit of the distance L1a is more preferably 6 mm or more, and an upper limit thereof is more preferably 9 mm or smaller. Similarly, a lower limit of the distance L1$b$ is more preferably 3 mm or more and an upper limit thereof is more preferably 4 mm or less.

As shown in FIG. 1, the outer shoulder lateral grooves 5A of the embodiment smoothly bend and extend while gradually increasing an angle α1$a$ to the circumferential direction. The angle α1$a$ is preferably 60 to 90 degrees. Such outer shoulder lateral grooves 5A ensure lateral rigidity of the outer shoulder land portion 8A. This improves the steering stability on a dry road surface.

As shown in FIG. 2 and FIG. 3, the outer shoulder lateral grooves 5A have tie bars 9$a$, 9$b$ disposed on both sides of the outer shoulder longitudinal groove 4A. The tie bars 9$a$, 9$b$ reduce the groove depth D2 by raised groove bottom 5A$b$. Such tie bars 9$a$, 9$b$ can reduce a circumferential rigidity step in a vehicle-outer-side region in the outer middle land portion 7A and a vehicle-inner-side region in the outer shoulder land portion 8A where uneven wear tends to occur. This improves uneven wear resistance and wear resistance. It is preferable that axial lengths L2$a$, L2$b$ of the tie bars 9$a$, 9$b$ are in the range of 2 to 14 mm. In addition, it is preferable that heights H2$a$, H2$b$ from the groove bottom 5A$b$ of the tie bars 9$a$, 9$b$ is 2 to 6 mm.

It is preferable that a groove depth D2$i$ at the vehicle-inner-side inner ends 5A$i$ of the outer shoulder lateral grooves 5A are made larger than a groove depth D2$o$ of the tie bars 9$b$. This allows groove volume, which tends to be reduced by the tie bars 9$b$, to be ensured in the outer middle land portion 7A, thereby improving the drainage performance and on-ice performance. A ratio (D2$i$/D2$o$) of the groove depth D2$i$ to the groove depth D2$o$ is preferably 150 to 200%.

As shown in FIG. 1, the outer middle lateral grooves 5B of the embodiment smoothly bend and extend while gradually increasing an angle α1$b$ to the circumferential direction. The angle α1$b$ is preferably 50 to 70 degrees and set smaller than the angle α1$a$ of the outer shoulder lateral grooves 5A. Such outer middle lateral grooves 5B ensure circumferential rigidity of the center land portion 6 and the outer middle land portion 7A. This improves straight running stability performance.

As shown in FIG. 2 and FIG. 3, the groove width W3 and the groove depth D3 of the outer middle lateral grooves 5B gradually decrease from the outer center longitudinal groove 3A to the inner ends 5B$i$. Such outer middle lateral grooves 5B ensure rigidity of the region on the side of the tire equator C whose ground-contact pressure increases when a vehicle drives straight. This further improves the straight running stability performance.

The outer middle lateral grooves 5B have tie bars 9$c$ on the vehicle outer side of the outer center longitudinal groove 3A. The tie bars 9$c$ reduce the groove depth D3 by a raised groove bottom 5B$b$. Such tie bars 9$c$ reduce a circumferential rigidity step in a vehicle-inner-side region in the outer middle land portion 7A. This improves the uneven wear resistance. It is preferable that axial length L2$c$ and height H2$c$ of the tie bars 9$c$ are respectively in the same range as the length L2$a$, L2$b$ and height H2$a$, H2$b$ of the outer shoulder lateral grooves 5A.

As shown in FIG. 1, the center land portion 6 consists of a straight rib which linearly extends without interruption in the circumferential direction on the tire equator C. Such a center land portion 6 improves its circumferential rigidity. This enhances the straight running stability performance. It is preferable that a land portion width W3$a$ of the center land portion 6 is 8 to 15% of the tread ground-contact width TW.

In addition, as shown in FIG. 3 in a close-up manner, the center land portion 6 includes center sipes 12 between the outer middle lateral grooves 5B which are circumferentially adjacent to each other. The center sipes 12 bend and extend from a vehicle-outer-side outer end 6$o$ of the center land portion 6, while gradually decreasing an angle α1$c$ to the circumferential direction. The center sipes 12 intersect with one side of the outer middle lateral grooves 5B in a neighborhood of the tire equator C. Such center sipes 12 suppress excessive deterioration in rigidity of the center land portion 6. Yet, since edges work in the axial and circumferential directions, the wear resistance and on-ice performance improve.

As shown in FIG. 1, the outer middle land portion 7A has a land portion width W3$b$ larger than a land portion width W3$c$ of the inner middle land portion 7B. Such an outer middle land portion 7A increases a land ratio on the outer side of the vehicle. This improves the steering stability, uneven wear resistance, and wear resistance on a dry road surface. A ratio (W3$b$/W3$c$) of the land portion width W3$b$ to the land portion width W3$c$ is preferably 105 to 130%.

As shown in FIG. 3, the outer middle land portion 7A includes outer middle thin grooves 13. The outer middle thin grooves 13 connect the inner ends 5M of the outer shoulder lateral grooves 5A with the outer ends 5B$o$ of the outer middle lateral grooves 5B. Thus, the outer shoulder lateral grooves 5A, the outer middle lateral grooves 5B, and the outer middle thin grooves 13 divide the outer middle land portion 7A into multiple circumferentially arranged outer middle blocks 15.

An orientation of inclination of the outer middle thin grooves to the circumferential direction is opposite to that of inclination of the outer shoulder lateral grooves 5A and of the outer middle lateral grooves 5B. In addition, a groove width of the outer middle thin grooves 13 is smaller than the groove width of the outer shoulder lateral grooves 5A and the outer middle lateral grooves 5B.

Such outer middle thin grooves 13 allow edges to work in a well-balanced manner on the circumferential and axial directions. This improves the on-ice performance. Furthermore, both groove walls of the outer middle thin grooves 13 come into contact with each other due to lateral force from a road surface at the time of revolution in which a ground-contact pressure of the outer middle land portion 7A increases. With this, the outer middle blocks 15, 15, which are circumferentially adjacent to each other, are mutually supported. Thus, rigidity of the outer middle land portion 7A is improved, and the steering stability, uneven wear resistance, and wear resistance on a dry road surface are improved. A length L4 of the outer middle thin groves 13 is preferably 2.0 to 8.0 mm.

If the length L4 of the outer middle thin grooves 13 is less than 2.0 mm, it is possible that the edge effect may not be produced adequately. To the contrary, if the length L4 of the outer middle thin grooves 13 exceeds 8.0 mm, the outer shoulder lateral grooves 5A and the outer middle lateral grooves 5B are spaced considerably. As a result, it is possible that the drainage performance may deteriorate. From such a viewpoint, a lower limit of the length L4 is preferably 4.0 mm or more and an upper limit thereof is preferably 7.0 mm or less.

An angle α2$a$ of the outer middle thin grooves 13 to the circumferential direction is preferably 20 to 40 degrees. If the angle α2$a$ is less than 20 degrees, it is possible that the edge effect is not produced adequately in the circumferential direction. To the contrary, even if the angle α2$a$ exceeds 40 degrees, the edge effect may not be produced adequately in the circumferential direction. From such a viewpoint, a lower limit of the angle α2$a$ is preferably 25 degrees or more and an upper limit thereof is preferably 37 degrees or less.

The outer middle blocks 15 include outer middle sipes 16 which extend from a vehicle-inner-side inner edge 15$i$ to the outer side of the vehicle. The outer middle sipes 16 extend linearly from an almost intermediate position of the inner edge 15$i$ in the circumferential direction with an inclination angle α2$b$ which is the same as the angle α1$b$ (as shown in FIG. 1) of the outer middle lateral grooves 5B. Vehicle-outer-side outer ends 16$o$ of the outer middle sipes 16 terminate within the outer middle land portion 7A. Such outer middle sipes 16 not only suppress the deterioration in rigidity of the outer middle blocks 15 but also improve the on-ice performance.

As shown in FIG. 1, the inner middle land portion 7B consists of a straight rib which linearly extends in the circumferential direction. With such an inner middle land portion 7B, its lateral rigidity is adequately maintained even if the land portion width W3$c$ is smaller than the land portion width W3$b$, as described above. This improves the steering stability on a dry road surface.

Figure 4:
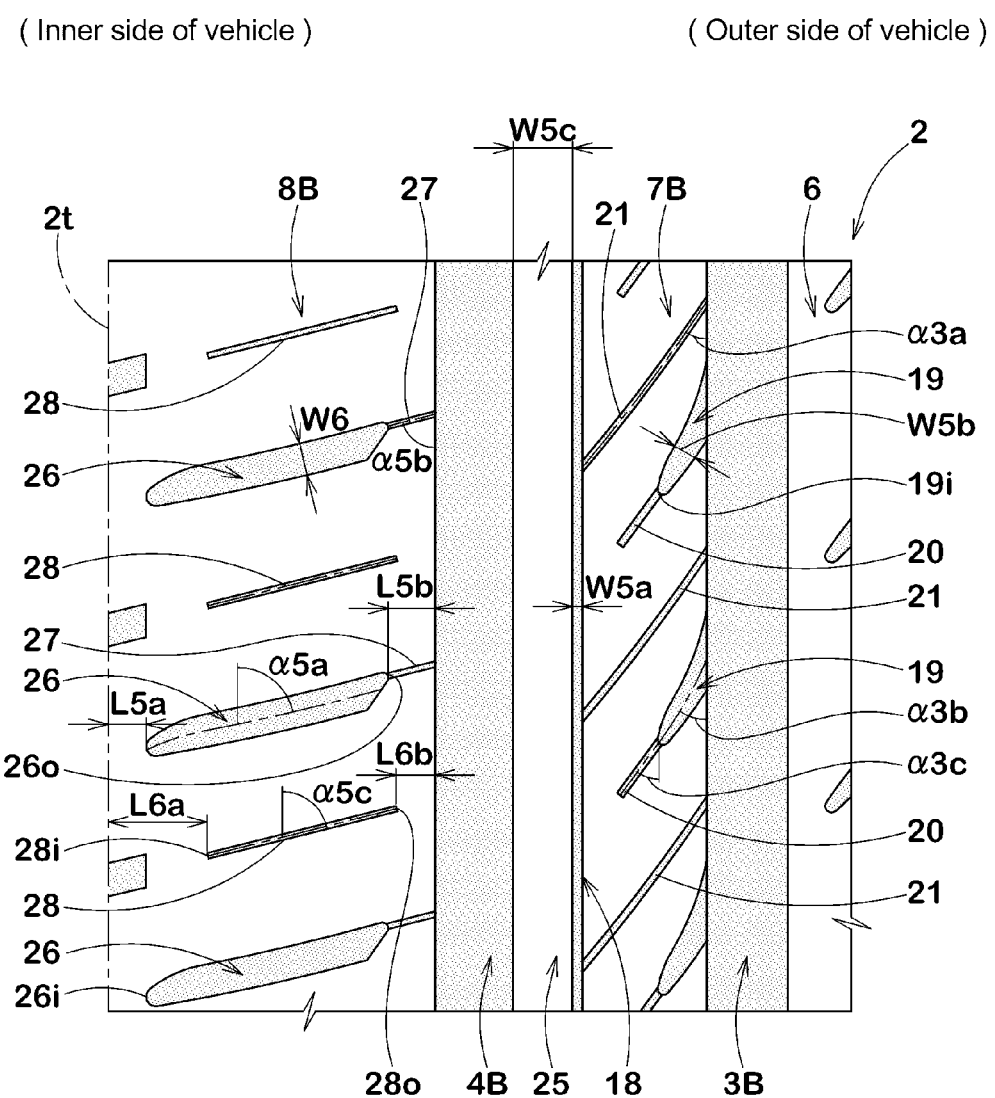
FIG. 4 is an enlarged view of FIG. 1 on an inner side of the vehicle.

As shown in FIG. 4 in a close-up manner, in this example, the inner middle 1 and portion 7B includes an inner middle sub-groove 18, inner middle sipes 21, inner middle slots 19, and extended sipes 20. With this, on the vehicle inner side of the inner middle sub-groove 18 in the inner middle land portion 7B, an inner middle thin rib 25 is formed which prevents arrangement of a sipe and the like.

The inner middle sub-groove 18 continuously extends in the circumferential direction in the inner middle land portion 7B. In this example, the inner middle sub-groove 18 is located on the vehicle inner side of the width center of the inner middle land portion 7B. With such an inner middle sub-groove 18, a water film between the inner middle land portion 7B and a road surface is smoothly guided to the circumferential direction. Yet, the circumferential edge improves the drainage performance and on-ice performance. It is preferable that a groove width W5$a$ of the inner middle sub-groove 18 is 5 to 10% of the land portion width W3$c$ (as shown in FIG. 1) of the inner middle land portion 7B. It is also preferable that a groove depth D5$a$ (as shown in FIG. 2) of the inner middle sub-groove 18 is 1 to 4 mm.

The inner middle sipes 21 extend between the inner middle sub-groove 18 and the inner center longitudinal groove 3B with an inclination with respect to the circumferential direction. In this example, the inner middle sipes 21 bend and extend from the inner center longitudinal groove 3B to the inner middle sub-groove 18, while gradually increasing an angle α3$a$ to the circumferential direction. Such inner middle sipes 21 allow edge thereof to work from the circumferential to axial direction, thereby improving the on-ice performance.

It is preferable that the angle α3$a$ of the inner middle sipes 21 is 20 to 60 degrees. If the angle α3$a$ is less than 20 degrees, the edge effect is not produced adequately on the circumferential direction. Thus, it is possible that the on-ice performance may not be improved adequately. To the contrary, even if the angle α3$a$ exceeds 60 degrees, the edge effect is not produced adequately on the axial direction. From such a viewpoint, a lower limit of the angle α3$a$ is preferably 30 degrees or more and an upper limit thereof is preferably 50 degrees or less.

The inner middle slots 19 extend from the inner center longitudinal groove 3B to the inner side of the vehicle, between the inner middle sipes 21, 21 which are circumferentially adjacent to each other. In this example, the inner middle slots 19 extend from an almost center of the circumferential direction between the inner middle sipes 21, 21 which are circumferentially adjacent to each other, with an inclination angle α3$b$ of, for example, 20 to 60 degrees, with respect to the circumferential direction. Vehicle-inner-side inner ends 19$i$ of the inner middle slots 19 terminate without reaching the inner middle sub-groove 18. In addition, a groove width W5$b$ and a groove depth D5$b$ (as shown in FIG. 2) of the inner middle slots 19 gradually decrease from the inner middle longitudinal groove 3B to the inner ends 19$i$.

Such inner middle slots 19 not only suppress the deterioration in rigidity of the inner middle land portion 7B but also improve the drainage performance and on-ice performance. The groove width W5$b$ of the inner middle slots 19 is preferably 5 to 9 mm and the groove depth D5$b$ of the inner middle slots 19 is preferably 5 to 9 mm.

The extended sipes 20 extend from the inner ends 19$i$ of the inner middle slots 19 with an inclination to the inner side of the vehicle. It is preferable that an angle of inclination α3$c$ of the extended sipes 20 to the circumferential direction is in the almost same angle range as the angle α3$b$ of the inner middle slots 19. Vehicle-inner-side inner ends 20$i$ of the extended sipes 20 terminate without reaching the inner middle sub-groove 18. Such extended sipes 20 not only suppress the deterioration in rigidity of the inner middle land portion 7B but also improve the on-ice performance.

The inner middle thin rib 25 continuously extends in the circumferential direction on the vehicle inner side of the inner middle sub-groove 18. Such an inner middle thin rib 25 improves lateral rigidity of the vehicle inner side. This improves the steering stability on a dry road surface. It is preferable that a ratio (W5$c$/W3$c$) of a rib width W5$c$ of the inner middle thin rib 25 to the land portion width W3$c$ of the inner middle land portion 7B is 20 to 40%.

If the ratio (W5$c$/W3$c$) is less than 20%, the lateral rigidity cannot be improved adequately. As a result, it is possible that the steering stability, wear resistance, and uneven wear resistance may not be maintained adequately. TO the contrary, even if the ratio (W5$c$/W3$c$) exceeds 40%, it is possible that the inner middle sipes 21 or the inner middle slots 19 become small, thereby deteriorating the drainage performance, on-snow performance, and on-ice performance. From such a viewpoint, a lower limit of the ratio (W5$c$/W3$c$) is preferably 25% or more and an upper limit thereof is preferably 35% or less.

As shown in FIG. 1, a land portion width W3$d$ of the outer shoulder land portion 8A is larger than a land portion width W3$e$ of the inner shoulder land portion 8B. With such an outer shoulder land portion 8A, a land ratio can be increased on the vehicle outer side of the tread portion 2 in which a ground-contact pressure increases at the time of revolution. This improves the steering stability, uneven wear resistance, and wear resistance on a dry road surface. A ratio (W3$d$/W3$e$) of the land portion width W3$d$ of the outer shoulder land portion 8A to the land portion width W3$e$ of the inner shoulder land portion 8B is preferably 101 to 110%.

The outer shoulder land portion 8A is divided by the outer shoulder lateral grooves 5A into multiple circumferentially arranged outer shoulder blocks 22. As shown in FIG. 3 in a close-up manner, the outer shoulder blocks 22 have circumferential sipes 23 and outer shoulder sipes 24.

The circumferential sipes 23 extend in the circumferential direction on the side of the outer shoulder longitudinal groove 4A. Both circumferential ends 23$t$ of the circumferential sipes 23 terminate without reaching the outer shoulder lateral grooves 5A, 5A, which are circumferentially adjacent to each other. Such circumferential sipes 23 alleviate rigidity of the vehicle-inner-side region in the outer shoulder land portion 8A, thus reducing a circumferential rigidity step. In addition, the circumferential edge improves the uneven wear resistance and on-ice performance.

It is preferable that two or more (two in this example) circumferential sipes 23 are formed in a region T which is 2 to 14 mm spaced on the circumferentially outer side from the vehicle-inner-side inner edge 8Ai of the outer shoulder land portion 8A. With this, the multiple circumferential sipes 23 are disposed in the region T having the same length as the length L2a of the tie bars 9a. As a result, because of a synergetic effect with the tie bars 9, the circumferential rigidity step in the vehicle-inner-side region of the outer shoulder land portion 8A decreases, thereby further suppressing occurrence of uneven wear.

The outer shoulder sipes 24 extend from the vehicle-outer-side tread ground-contact end 2t with an inclination to the inner side of the vehicle. It is preferable that an angle α4a of inclination of the outer shoulder sipes 24 to the circumferential direction is in the same angle range as the angle α1a (as shown in FIG. 1) of the outer shoulder lateral grooves 5A. With such outer shoulder sipes 24, the axial edge improves the on-ice performance.

Inner ends 24i of the outer shoulder sipes 24 terminate without reaching the circumferential sipes 23 and the outer shoulder longitudinal groove 4A. Such outer shoulder sipes 24 suppress the deterioration in rigidity of the outer shoulder land portion 8A.

As shown in FIG. 1, the inner shoulder land portion 8B consists of a straight rib which linearly extends in the circumferential direction on the side of the vehicle-inner-side tread ground-contact end 2t. Such an inner shoulder land portion 8B improves its lateral rigidity and enhances the steering stability. The land portion width W3e of the inner shoulder land portion 8B is preferably 11 to 15% of the tread ground-contact width TW.

As shown in FIG. 4, the inner shoulder land portion 8B includes both inner shoulder lateral grooves 26 and inner shoulder auxiliary grooves 28.

The inner shoulder lateral grooves 26 extend to the outer side of the vehicle from inner ends 26i which are spaced a distance L5a to the outer side of the vehicle from the vehicle-inner-side tread ground-contact and 2t. In this example, the inner shoulder lateral grooves 26 extend from the inner ends 26i with an inclination angle α5a of, for example, 60 to 90 degrees, with respect to the circumferential direction. Vehicle-outer-side outer ends 26o of the inner shoulder lateral grooves 26 terminate within the inner shoulder land portion 8B. Such inner shoulder lateral grooves 26 not only suppress the deterioration in rigidity of the inner shoulder land portion 8B but also improve the drainage performance and on-snow performance. It is preferable that a groove width W6 of the inner shoulder lateral grooves 26 is 1 to 3% of the tread ground-contact width TW (as shown in FIG. 1). It is also preferable that a maximum groove depth D6 (as shown in FIG. 2) of the inner shoulder lateral grooves 26 is 6 to 10 mm.

The distance L5a of the inner shoulder lateral grooves 26 is preferably 2.5 to 7.5 mm. If the distance L5a is less than 2.5 mm, it is possible that the rigidity of the inner shoulder land portion 8B is not maintained adequately, thereby making it impossible to adequately maintain the steering stability, wear resistance, and uneven wear resistance. To the contrary, if the distance L5a exceeds 7.5 mm, the inner shoulder lateral grooves 26 become short, thereby making it impossible to adequately maintain the drainage performance and on-snow performance. Similarly, the distance L5b from the outer ends 26o of the inner shoulder lateral grooves 26 to the inner shoulder longitudinal groove 4B is preferably 4 mm or more and preferably 7 mm or less.

It is preferable that the outer ends 26o of the inner shoulder lateral grooves 26 are formed in a tapered shape. Such inner shoulder lateral grooves 26 can minimize the deterioration in rigidity of the inner shoulder land portion 8B.

Furthermore, in the inner shoulder land portion 8B, it is preferable that extended sipes 27 are disposed, which extend between the vehicle-outer-side outer ends 26o of the inner shoulder lateral grooves 26 and the inner shoulder longitudinal groove 4B. The extended sipes 27 incline at an angle α5b which is in the same angle range as that of the angle α5a of the inner shoulder lateral grooves 26. The extended sipes 27 contribute to improvement in the drainage performance and on-ice performance.

The inner shoulder auxiliary grooves 28 are formed between the inner shoulder lateral grooves 26, 26 which are circumferentially adjacent to each other. Vehicle-inner-side inner ends 28i of the inner shoulder auxiliary grooves 28 are spaced a distance L6a from the vehicle-inner-side tread ground-contact end 2t to the outer side of the vehicle. The inner shoulder auxiliary groves 28 extend from the inner ends 28i, with an inclination angle α5c which is in the same angle range as that of the angle α5a of the inner shoulder lateral grooves 26. Vehicle-outer-side outer ends 28o of the inner shoulder auxiliary grooves 28 terminate within the inner shoulder land portion 8B. Such inner shoulder auxiliary grooves 28 improve the drainage performance and on-ice performance, while maintaining the steering stability on a dry road surface.

The distance L6a of the inner shoulder auxiliary grooves 28 is preferably 8 to 15 mm. If the distance L6a is less than 8 mm, it is possible that the steering stability, wear resistance, and uneven wear resistance may not be maintained adequately. To the contrary, if the distance L6a exceeds 15 mm, it is possible that the drainage performance and on-ice performance may not be maintained adequately. Similarly, a distance L6b from the outer ends 28o of the inner shoulder auxiliary grooves 28 to the inner shoulder longitudinal groove 4B is preferably 3 mm or more and preferably 6 mm or less.

so far particularly preferred embodiments of the present invention have been described in detail. However, the present invention is not limited to the embodiments as shown, and may be performed as various modifications.

EXAMPLES

Tires consisting of the basic structure shown in FIG. 1 and having longitudinal grooves, lateral grooves, and sipes as shown in Table 1 were manufactured and their performance was evaluated.

Figure 5A:
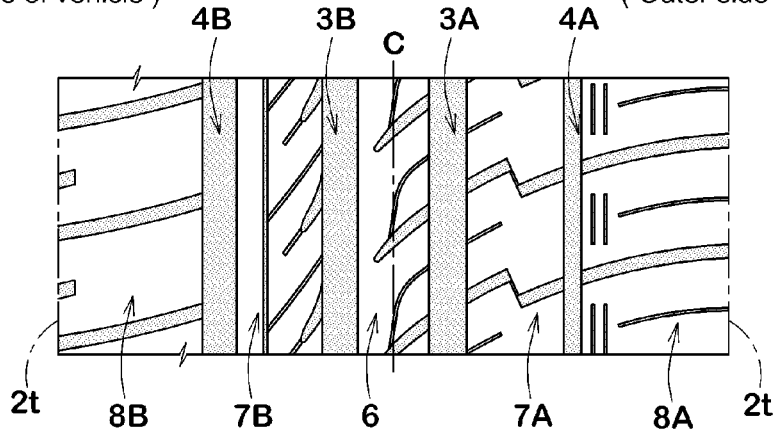
FIG. 5A is an expansion plan of a tread portion of Comparative Example 1.
Figure 5B:
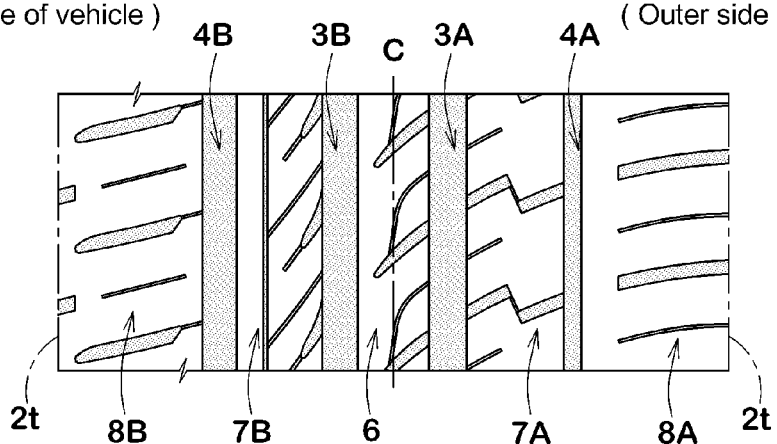
FIG. 5B is an expansion plan of a tread portion of Comparative Example 2.
Figure 5C:
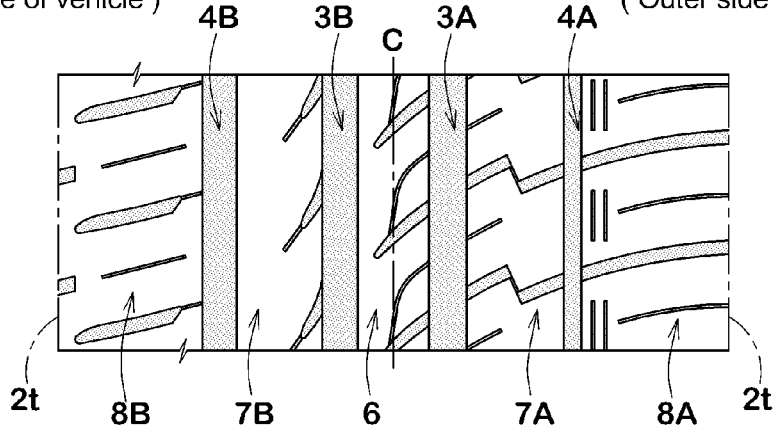
FIG. 5C is an expansion plan of a tread portion of Comparative Example 3.

In addition, a comparative example 1 as shown in FIG. 5A, comparative example 2 as shown in FIG. 5B, and comparative example 3 as shown in FIG. 5c were created for the purpose of comparison, and evaluated similarly. In the comparative example 1, although an inner shoulder land portion 8B is divided into blocks, it does not have inner shoulder auxiliary grooves 28. In the comparative example 2, an outer shoulder land portion 8A consists of a straight rib. In addition, the comparative example 3 does not have an inner middle sub-groove 18 and inner middle sipes 21. In addition, common specifications shall be as follows:

Tread ground-contact width TW: 194 mm
  <Outer center longitudinal groove>
  Groove width W1a: 11.4 mm, maximum groove depth
    D1a: 9.5 mm
  <Inner center longitudinal groove>
  Groove width W1b: 10.4 mm, maximum groove depth
    D1b: 9.5 mm <Outer shoulder longitudinal groove>
Groove width W1c: 5.7 mm, maximum groove depth D1c: 9.5 mm
<Inner shoulder longitudinal groove>
Groove width W1d: 9.5 mm, maximum groove depth D1d: 9.5 mm
Ratio (W1a/W1b): 109.6%
Ratio (W1c/W1a): 50.0%
<Inner middle sub-groove>
Groove width W5a: 2 mm, ratio (W5a/W3c): 8.1%
Groove depth D5a: 2 mm
<Outer shoulder lateral grooves>
Groove width W2: 3.8 mm, groove depth D2: 7.5 mm
Angle α1a: 60 to 90 degrees
Groove depth D2i of inner ends: 7.5 mm
Groove depth D2o on the side of the outer shoulder longitudinal groove: 4.3 mm
Ratio (D2i/D2o): 174.4%
<Outer middle lateral grooves>
Groove width W3: 3.8 mm, groove depth D3: 7.5 mm
Angle α1b: 50 to 70 degrees
<Tie bar>
Height H2a, H2b, H2c: 3.8 mm
Length L2a, L2b, L2c: 7.6 mm
Land portion width W3a of the center land portion: 11.4 mm
Land portion width W3b of the outer middle land portion: 28.4 mm
Land portion width W3c of the inner middle land portion: 24.6 mm
Land portion width W3d of the outer shoulder land portion: 36.0 mm
Land portion width W3e of the inner shoulder land portion: 35.1 mm
Ratio (W3b/W3c): 115.4%
Ratio (W3d/W3e): 102.6%
A test method is as follows:
<Drainage Performance>
Each sample tire (tire size: 225/55R17) is mounted around a rim (rim size: 17×7.0 JJ), filled with internal pressure of 230 kPa, and mounted to all wheels of a domestically produced FR vehicle (4300 cc displacement). Then, on an asphalt road surface having water depth of 5 mm, full-braking was performed on the condition that ABS turns on from a speed of 60 km, and a braking distance was measured. The result is indicated with an index in which the comparative example 1 is 100, for an inverse of the braking distance. The larger a numeric value is, the better the drainage performance is.

<Wear Resistance>
Each sample tire (tire size: 195/65R15) is mounted around a rim (rim size: 15×6.0 JJ), filled with internal pressure of 230 kPa, and mounted to all wheels of a domestically produced FR vehicle (2000 cc displacement). Then, after driving on a dry asphalt road surface for 8000 km, groove depth of an outer center longitudinal groove and an outer shoulder longitudinal groove was measured. The measurement was performed on three positions on the circumference of each tire, and all average values were obtained. The result is indicated with an index in which the comparative example 1 is 100, for each average value. The larger a numeric value is, the better the wear resistance is.
<Uneven Wear Resistance>
Each sample tire (tire size: 195/65R15) is mounted around a rim (rim size: 15×6.0 JJ), filled with internal pressure of 230 kPa, and mounted to all wheels of a domestically produced FR vehicle (2000 cc displacement). Then, after driving on a dry asphalt road surface for 8000 km, a difference in an amount of wear between circumferential inner edge and outer edge was measured in an outer middle land portion and an outer shoulder land portion. The measurement was performed on three positions on the circumference of each tire, and all average values were obtained. The result is indicated with an index in which the comparative example 1 is 100, for an inverse of each average value. The larger a numeric value is, the better the uneven wear resistance is.
<Steering Stability Performance>
Each sample tire (tire size: 225/55R17) is mounted around a rim (rim size: 17×7.033), filled with internal pressure of 230 kPa, and mounted to all wheels of a domestically produced FR vehicle (4300 cc displacement). Then, one driver drove the vehicle on a dry asphalt road surface of a test course. Then, the characteristics related to handle responsiveness, rigidity feel, and grip and the like were sensory evaluated by the professional driver. The result is indicated with a mark in which the comparative example 1 is 100. The larger a numeric value is, the better the steering stability is.
<On-snow Performance>
Each sample tire (tire size: 225/55R17) is mounted around a rim (rim size: 17×7.0 JJ), filled with internal pressure of 230 kPa, and mounted to all wheels of a domestically produced FR vehicle (4300 cc displacement). Then, the vehicle was driven on icy and snowy road of a test course. The characteristics related to straight running stability, braking stability, handle responsiveness, rigidity feel, grip, and the like were sensory evaluated by a professional driver. The result is indicated with a mark in which the comparative example 1 is 100. The larger a numeric value is, the better the on-ice performance is.
Table 1 shows test results.

TABLE 1

|  | Comparative example 1 | Comparative example 2 | Comparative example 3 | Example 1 | Example 2 | Example 3 | Example 4 |
|---|---|---|---|---|---|---|---|
| Expansion plan of tread portion | FIG. 5A | FIG. 5B | FIG. 5C | FIG. 1 | FIG. 1 | FIG. 1 | FIG. 1 |
| Angle α3a of inner middle sipe (degrees) | 40 to 50 | 40 to 50 | — | 40 to 50 | 20 to 30 | 50 to 60 | 40 |
| Angle α3b of middle slot (degrees) | 45 | 45 | 45 | 45 | 45 | 45 | 45 |
| Presence or absence of outer shoulder sipe | Present | Present | Present | Present | Present | Present | Present |
| Rib width W5c of inner middle thin rib (mm) | 7.6 | 7.6 | 7.6 | 7.6 | 7.6 | 7.6 | 7.6 |
| Ratio (W5c/W3c) (%) | 30.9 | 30.9 | 30.9 | 30.9 | 30.9 | 30.9 | 30.9 |
| Presence or absence of outer middle thin groove | Present | Present | Present | Present | Present | Present | Present |
| Length L4 of outer middle thin groove (mm) | 4.7 | 4.7 | 4.7 | 4.7 | 4.7 | 4.7 | 4.7 |
| Angle α2a of outer middle thin groove (degrees) | 30 | 30 | 30 | 30 | 30 | 30 | 30 |
| Distance L5a between inner end of inner shoulder lateral groove and tread ground-contact end (mm) | — | 3.8 | 3.8 | 3.8 | 3.8 | 3.8 | 3.8 |

TABLE 1-continued

|  | | Example 5 | Example 6 | Example 7 | Example 8 | Example 9 | Example 10 | Example 11 | Example 12 |
|---|---|---|---|---|---|---|---|---|---|
| Distance L5b between outer end of inner shoulder lateral groove and inner shoulder longitudinal groove (mm) | | — | 5.7 | 5.7 | 5.7 | 5.7 | 5.7 | 5.7 | 5.7 |
| Distance L6a between inner end of inner shoulder auxiliary groove and tread ground-contact end (mm) | | — | 12.3 | 12.3 | 12.3 | 12.3 | 12.3 | 12.3 | 12.3 |
| Distance L6b between outer end of inner shoulder auxiliary groove and inner shoulder longitudinal groove (mm) | | — | 4.7 | 4.7 | 4.7 | 4.7 | 4.7 | 4.7 | 4.7 |
| Drainage performance (Index) [The larger, the better.] | | 100 | 90 | 95 | 98 | 100 | 96 | 98 | |
| Wear resistance (Index) [The larger, the better.] | | 100 | 105 | 100 | 105 | 105 | 105 | 105 | |
| Uneven wear resistance (Index) [The larger, the better.] | | 100 | 105 | 100 | 110 | 105 | 112 | 110 | |
| Steering stability (Index) [The larger, the better.] | | 100 | 105 | 98 | 105 | 100 | 107 | 105 | |
| On-ice performance (Index) [The larger, the better.] | | 100 | 90 | 85 | 110 | 107 | 105 | 105 | |

|  | Example 5 | Example 6 | Example 7 | Example 8 | Example 9 | Example 10 | Example 11 | Example 12 |
|---|---|---|---|---|---|---|---|---|
| Expansion plan of tread portion | FIG. 1 | FIG. 1 | FIG. 1 | FIG. 1 | FIG. 1 | FIG. 1 | FIG. 1 | FIG. 1 |
| Angle α3a of inner middle sipe (degrees) | 40 to 50 | 40 to 50 | 40 to 50 | 40 to 50 | 40 to 50 | 40 to 50 | 40 to 50 | 40 to 50 |
| Angle α3b of middle slot (degrees) | — | 45 | 45 | 45 | 45 | 45 | 45 | 45 |
| Presence or absence of outer shoulder sipe | Present | Absent | Present | Present | Present | Present | Present | Present |
| Rib width W5c of inner middle thin rib (mm) | 7.6 | 7.6 | 4.9 | 9.8 | 7.6 | 7.6 | 7.6 | 7.6 |
| Ratio (W5c/W3c) (%) | 30.9 | 30.9 | 19.9 | 39.8 | 30.9 | 30.9 | 30.9 | 30.9 |
| Presence or absence of outer middle thin groove | Present | Present | Present | Present | Absent | Present | Present | Present |
| Length L4 of outer middle thin groove (mm) | 4.7 | 4.7 | 4.7 | 4.7 | — | 2.0 | 8.0 | 4.7 |
| Angle α2a of outer middle thin groove (degrees) | 30 | 30 | 30 | 30 | — | 30 | 30 | 20 |
| Distance L5a between inner end of inner shoulder lateral groove and tread ground-contact end (mm) | 3.8 | 3.8 | 3.8 | 3.8 | 3.8 | 3.8 | 3.8 | 3.8 |
| Distance L5b between outer end of inner shoulder lateral groove and inner shoulder longitudinal groove (mm) | 5.7 | 5.7 | 5.7 | 5.7 | 5.7 | 5.7 | 5.7 | 5.7 |
| Distance L6a between inner end of inner shoulder auxiliary groove and tread ground-contact end (mm) | 12.3 | 12.3 | 12.3 | 12.3 | 12.3 | 12.3 | 12.3 | 12.3 |
| Distance L6b between outer end of inner shoulder auxiliary groove and inner shoulder longitudinal groove (mm) | 4.7 | 4.7 | 4.7 | 4.7 | 4.7 | 4.7 | 4.7 | 4.7 |
| Drainage performance (Index) [The larger, the better.] | 95 | 97 | 98 | 97 | 95 | 100 | 95 | 100 |
| Wear resistance (Index) [The larger, the better.] | 107 | 107 | 103 | 103 | 106 | 105 | 105 | 105 |
| Uneven wear resistance (Index) [The larger, the better.] | 110 | 105 | 105 | 105 | 110 | 110 | 112 | 110 |
| Steering stability (Index) [The larger, the better.] | 107 | 107 | 100 | 105 | 105 | 106 | 105 | 105 |
| On-ice performance (Index) [The larger, the better.] | 105 | 102 | 108 | 103 | 103 | 106 | 112 | 107 |

|  | Example 13 | Example 14 | Example 15 | Example 16 | Example 17 |
|---|---|---|---|---|---|
| Expansion plan of tread portion | FIG. 1 | FIG. 1 | FIG. 1 | FIG. 1 | FIG. 1 |
| Angle α3a of inner middle sipe (degrees) | 40 to 50 | 40 to 50 | 40 to 50 | 40 to 50 | 40 to 50 |
| Angle α3b of middle slot (degrees) | 45 | 45 | 45 | 45 | 45 |
| Presence or absence of outer shoulder sipe | Present | Present | Present | Present | Present |
| Rib width W5c of inner middle thin rib (mm) | 7.6 | 7.6 | 7.6 | 7.6 | 7.6 |
| Ratio (W5c/W3c) (%) | 30.9 | 30.9 | 30.9 | 30.9 | 30.9 |
| Presence or absence of outer middle thin groove | Present | Present | Present | Present | Present |
| Length L4 of outer middle thin groove (mm) | 4.7 | 4.7 | 4.7 | 4.7 | 4.7 |
| Angle α2a of outer middle thin groove (degrees) | 40 | 30 | 30 | 30 | 30 |
| Distance L5a between inner end of inner shoulder lateral groove and tread ground-contact end (mm) | 3.8 | 2.5 | 5.0 | 3.8 | 3.8 |
| Distance L5b between outer end of inner shoulder lateral groove and inner shoulder longitudinal groove (mm) | 5.7 | 4.0 | 7.0 | 5.7 | 5.7 |
| Distance L6a between inner end of inner shoulder auxiliary groove and tread ground-contact end (mm) | 12.3 | 12.3 | 12.3 | 8.0 | 15.0 |
| Distance L6b between outer end of inner shoulder auxiliary groove and inner shoulder longitudinal groove (mm) | 4.7 | 4.7 | 4.7 | 3.0 | 6.0 |

TABLE 1-continued

| | | | | | |
|---|---|---|---|---|---|
| Drainage performance (Index) [The larger, the better.] | 96 | 101 | 96 | 98 | 97 |
| Wear resistance (Index) [The larger, the better.] | 105 | 100 | 108 | 101 | 106 |
| Uneven wear resistance (Index) [The larger, the better.] | 110 | 100 | 112 | 101 | 111 |
| Steering stability (Index) [The larger, the better.] | 105 | 102 | 110 | 103 | 107 |
| On-ice performance (Index) [The larger, the better.] | 105 | 115 | 103 | 112 | 106 |

As a result of testing, it was confirmed that the tire of the example could improve the drainage performance, on-snow performance, and on-ice performance while maintaining the steering stability on a dry road surface.

Description of Symbols

1: Pneumatic tire
2: Tread portion
5A: Outer shoulder lateral groove
7B: Inner middle land portion
8A: Outer shoulder land portion
8B: Inner shoulder land portion
21: Inner middle sipe
22: outer shoulder block
26: Inner shoulder lateral groove
28: Inner shoulder auxiliary groove

What is claimed is:

1. A pneumatic tire having a designated mounting orientation with respect to a vehicle, wherein a tread portion of the tire comprises a pair of center longitudinal grooves which continuously extends in a circumferential direction on both sides of a tire equator and a pair of shoulder longitudinal grooves which continuously extends in the circumferential direction on both sides of the pair of center longitudinal grooves, wherein:

the pair of center longitudinal grooves consists of an outer center longitudinal groove and an inner center longitudinal groove, the outer center longitudinal groove and the inner center longitudinal groove being respectively located on an outer side and an inner side of the vehicle when the tire is mounted to the vehicle, the pair of shoulder longitudinal grooves consists of an outer shoulder longitudinal groove disposed on the vehicle outer side of the outer center longitudinal groove and an inner shoulder longitudinal groove disposed on a vehicle inner side of the inner center longitudinal groove, the tread portion is divided into: a center land portion between the pair of center longitudinal grooves; an outer middle land portion between the outer center longitudinal groove and the outer shoulder longitudinal groove; an inner middle land portion between the inner center longitudinal groove and the inner shoulder longitudinal groove; an outer shoulder land portion located of the vehicle outer side of the outer shoulder longitudinal groove; and an inner shoulder land portion located of the vehicle inner side of the inner shoulder longitudinal groove, the outer shoulder land portion comprises an array of blocks in which outer shoulder blocks sectioned by outer shoulder lateral grooves are disposed in the circumferential direction, the outer shoulder lateral grooves extend from a vehicle-outer-side tread ground-contact end to the inner side of the vehicle and traverse the outer shoulder land portion, the inner shoulder land portion comprises inner shoulder lateral grooves and inner shoulder auxiliary grooves, the inner shoulder lateral grooves extending to the outer side of the vehicle from an inner end which is spaced from a vehicle-inner-side tread ground-contact end to the outer side of the vehicle and having an outer end terminating within the inner shoulder land portion, the inner shoulder auxiliary grooves being disposed between the inner shoulder lateral grooves which are circumferentially adjacent to each other, extending to the outer side of the vehicle from an inner end which is spaced from the vehicle-inner-side tread ground-contact end to the outer side of the vehicle, and having an outer end terminating within the inner shoulder land portion, and the inner middle land portion comprises an inner middle sub-groove and inner middle sipes, the inner middle sub-groove continuously extends in the circumferential direction at a position which is on the vehicle inner side of a width center of the inner middle land portion, the inner middle sipes extend between the inner middle sub-groove and the inner center longitudinal groove with an inclination with respect to the circumferential direction, and the inner middle sipes have an angle with respect to the circumferential direction which gradually increases from the inner center longitudinal groove to the inner middle sub-groove.

2. The pneumatic tire according to claim 1 wherein:
the inner middle land portion comprises inner middle slots between the inner middle sipes which are circumferentially adjacent to each other, and
the inner middle slots extend from the inner center longitudinal groove to the inner side of the vehicle and terminate without reaching the inner middle sub-groove.

3. The pneumatic tire according to claim 1 wherein:
the outer shoulder land portion comprises outer shoulder sipes between the outer shoulder lateral groves which are circumferentially adjacent to each other, and
the outer shoulder sipes extend from the vehicle-outer-side tread ground-contact end to the inner side of the vehicle and terminate without reaching the outer shoulder longitudinal groove.

4. The pneumatic tire according to claim 1 wherein a vehicle-inner-side inner end of the outer shoulder lateral grooves terminate within the outer middle land portion.

5. The pneumatic tire according to claim 4 wherein: the tread portion comprises outer middle lateral grooves,
the outer middle lateral grooves extend from an outer end located in the outer middle land portion to the inner side of the vehicle, and have an inner end terminating within the center land portion,
not only the inner end of the outer shoulder lateral grooves and the outer end of the outer middle lateral grooves are shifted in the circumferential direction, but also the outer middle land portion comprises outer middle thin grooves connecting the inner end of the outer shoulder lateral grooves and the outer end of the outer middle lateral grooves, and the outer middle thin grooves have a groove width which is smaller than those of the outer shoulder lateral grooves and the outer middle lateral grooves.

6. A pneumatic tire having a designated mounting orientation with respect to a vehicle, wherein a tread portion of the tire comprises a pair of center longitudinal grooves which continuously extends in a circumferential direction on both sides of a tire equator and a pair of shoulder longitudinal grooves which continuously extends in the circumferential direction on both sides of the pair of center longitudinal grooves, wherein:

the pair of center longitudinal grooves consists of an outer center longitudinal groove and an inner center longitudinal groove, the outer center longitudinal groove and the inner center longitudinal groove being respectively located on an outer side and an inner side of the vehicle when the tire is mounted to the vehicle;

the pair of shoulder longitudinal grooves consists of an outer shoulder longitudinal groove disposed on the vehicle outer side of the outer center longitudinal groove and an inner shoulder longitudinal groove disposed on a vehicle inner side of the inner center longitudinal groove;

the tread portion is divided into: a center land portion between the pair of center longitudinal grooves; an outer middle land portion between the outer center longitudinal groove and the outer shoulder longitudinal groove; an inner middle land portion between the inner center longitudinal groove and the inner shoulder longitudinal groove; an outer shoulder land portion located of the vehicle outer side of the outer shoulder longitudinal groove; and an inner shoulder land portion located of the vehicle inner side of the inner shoulder longitudinal groove;

the outer shoulder land portion comprises an array of blocks in which outer shoulder blocks sectioned by outer shoulder lateral grooves are disposed in the circumferential direction, the outer shoulder lateral grooves extend from a vehicle-outer-side tread ground-contact end to the inner side of the vehicle and traverse the outer shoulder land portion, and a vehicle-inner-side inner end of the outer shoulder lateral grooves terminates within the outer middle land portion;

the inner shoulder land portion comprises inner shoulder lateral grooves and inner shoulder auxiliary grooves, the inner shoulder lateral grooves extending to the outer side of the vehicle from an inner end which is spaced from a vehicle-inner-side tread ground-contact end to the outer side of the vehicle and having an outer end terminating within the inner shoulder land portion, the inner shoulder auxiliary grooves being disposed between the inner shoulder lateral grooves which are circumferentially adjacent to each other, extending to the outer side of the vehicle from an inner end which is spaced from the vehicle-inner-side tread ground-contact end to the outer side of the vehicle, and having an outer end terminating within the inner shoulder land portion; and the inner middle land portion comprises an inner middle sub-groove and inner middle sipes, the inner middle sub-groove continuously extends in the circumferential direction at a position which is on the vehicle inner side of a width center of the inner middle land portion, and the inner middle sipes extend between the inner middle sub-groove and the inner center longitudinal groove with an inclination with respect to the circumferential direction; and the tread portion comprises outer middle lateral grooves which extend from an outer end located in the outer middle land portion to the inner side of the vehicle, and have an inner end terminating within the center land portion, provided that not only the inner end of the outer shoulder lateral grooves and the outer end of the outer middle lateral grooves are shifted in the circumferential direction, but also the outer middle land portion comprises outer middle thin grooves connecting the inner end of the outer shoulder lateral grooves and the outer end of the outer middle lateral grooves, and the outer middle thin grooves have a groove width which is smaller than those of the outer shoulder lateral grooves and the outer middle lateral grooves.

* * * * *